March 28, 1939. W. E. HARDEMAN ET AL 2,152,476
TRACTOR ATTACHMENT FOR WHEELS
Filed Aug. 20, 1937   2 Sheets-Sheet 1
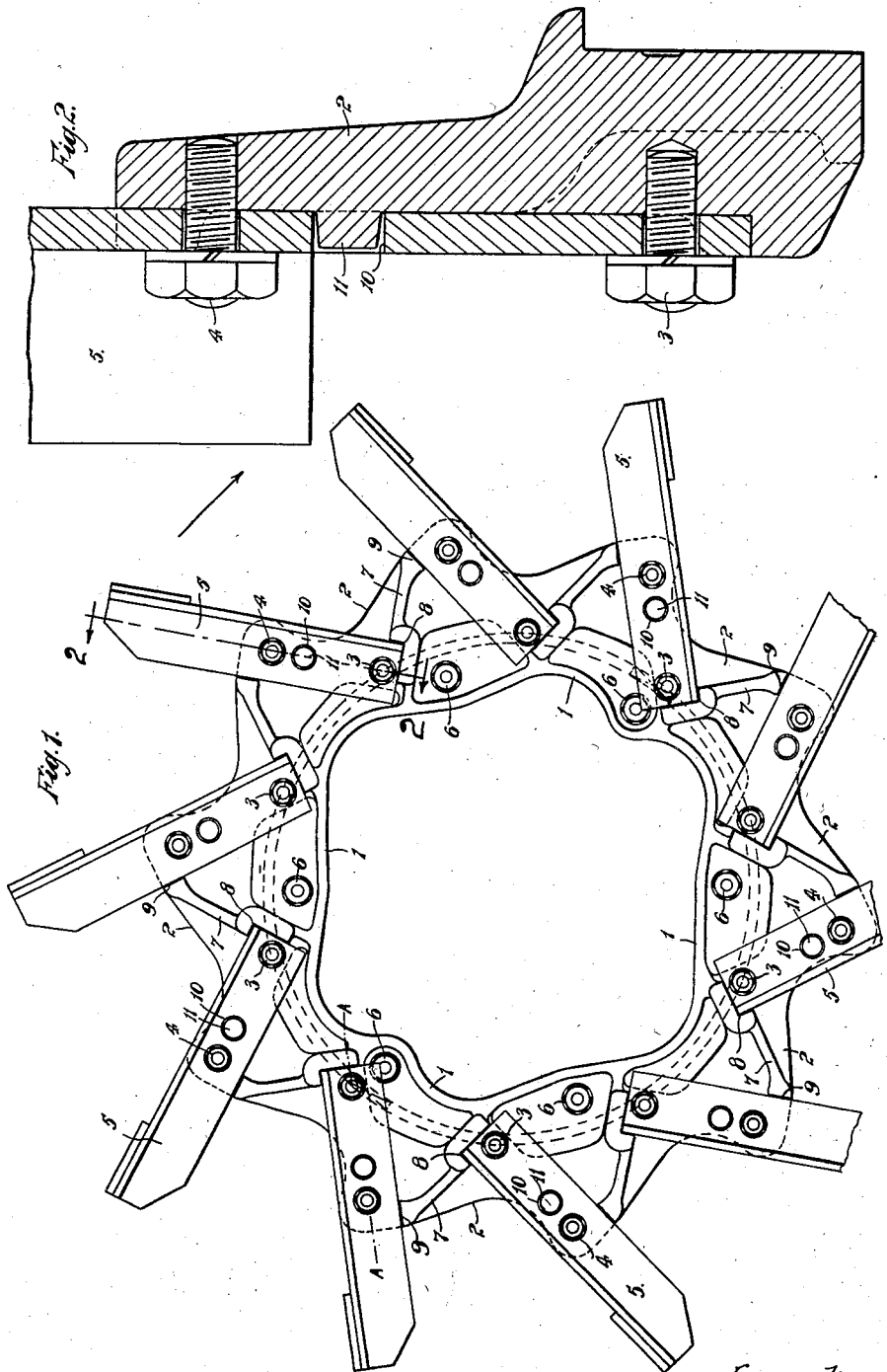
Inventors
WILLIAM EDWARD HARDEMAN
REGINALD FRANK DAW
ATTORNEYS March 28, 1939.   W. E. HARDEMAN ET AL   2,152,476
TRACTOR ATTACHMENT FOR WHEELS
Filed Aug. 20, 1937   2 Sheets-Sheet 2
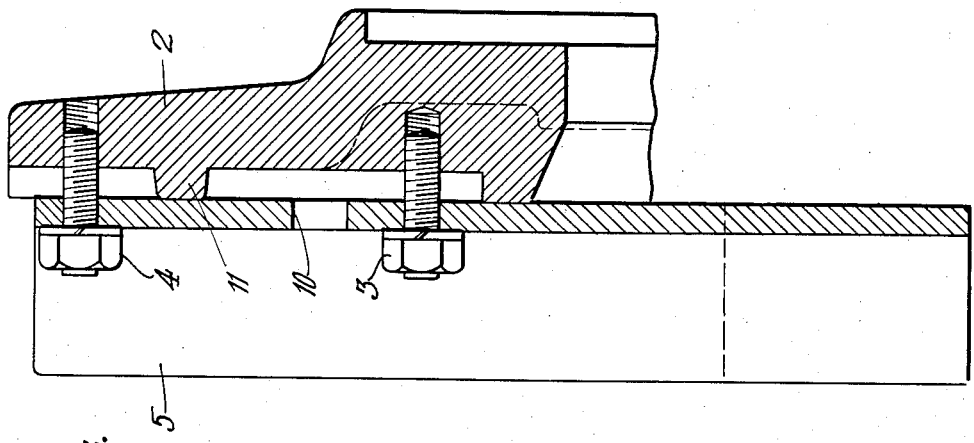
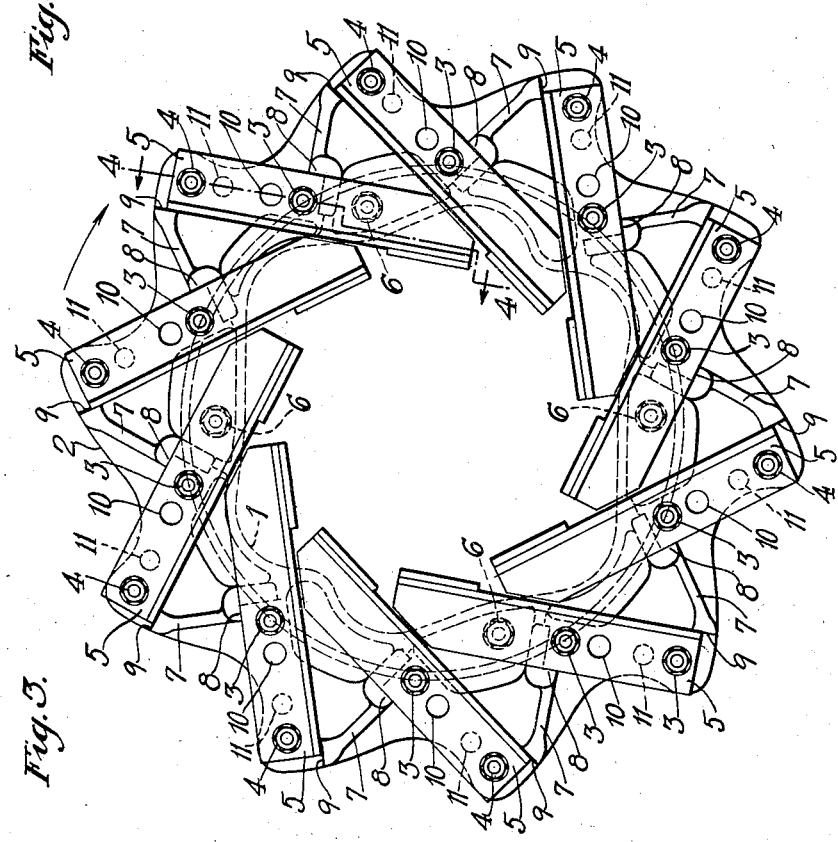
INVENTORS
WILLIAM EDWARD HARDEMAN.
REGINALD FRANK DAW.
BY
Benj. T. Rauber ATTORNEY.

Patented Mar. 28, 1939

2,152,476

UNITED STATES PATENT OFFICE 2,152,476

TRACTOR ATTACHMENT FOR WHEELS

William Edward Hardeman, Acocks Green, Birmingham, and Reginald Frank Daw, Stechford, Birmingham, England, assignors to Dunlop Tire and Rubber Corporation, Buffalo, N. Y., a corporation of New York Application August 20, 1937, Serial No. 160,006
In Great Britain August 22, 1936

5 Claims. (Cl. 301—39)

Our invention relates to improvements in tractor attachments for vehicle wheels, particularly suitable for wheels fitted with pneumatic tires, whereby strakes may be provided to extend a short distance beyond the periphery of the tire for tractor purposes, but which may be placed in inoperative position when not required.

Our invention provides means whereby the strakes may be detachably secured on the attachment and in which the stresses imposed on the strakes are taken up by lugs on the wheel attachment.

In our invention, we provide an attachment for vehicle wheels having a number of integral lugs at spaced intervals about the attachment, so arranged that a strake may be mounted thereon with its inner end abutting one lug and a side abutting and supported by an adjacent lug. The strakes may be secured on the attachment by means of bolts, or screws, or other attaching means. Stresses imposed upon the strakes as the wheel rotates are transmitted directly to the lugs, the end thrust being taken by one lug and sidewise thrusts on the other. The strakes are preferably slightly inclined from a radial position or tangent to a circle within and concentric with the wheel so that the sidewise supporting end abutment abuts against the inner side of the strake. When the strakes are placed in the inoperative position they are positioned on the upstanding or top edge of the lug being supported also by a stud. In this position the strakes extend inwardly out of the way and leaving the periphery of the wheel free and unobstructed.

The various features of the invention are illustrated by way of example in the accompanying drawings in which—

Fig. 1 is a side elevation of the attachment; Fig. 2 is a part sectional view along the line AA of Fig. 1; Fig. 3 is a side view of a portion of the wheel showing the strakes in inoperative position, and Fig. 4 is a section of the wheel and strake taken on the line 4—4 of Fig. 3.

As shown in the drawings the supporting ring 1 is provided with integral webs 2 which project substantially radially at circumferential intervals from the outer periphery of the ring 1.

Each of the webs 2 is pierced with a pair of threaded holes positioned on lines non-radial to the ring, and strakes 5 are non-radially and detachably secured to the webs 2 by studs 3 and 4 passing through clearance apertures in each strake 5 into the threaded holes formed in the webs 2.

The ring is also formed with bolt holes to pass bolts 6 which secure the ring to the outer side of the tractor wheel not shown.

The strakes 5 as shown are of angle iron, but may also be cast or of channel section or flat bar and are obliquely positioned across the supporting ring and webs, and are provided with holes of enlarged diameter corresponding to and in axial alignment with the threaded holes 3 and 4 in the webs 2. At their outer ends they are provided with pads 5'.

To provide the necessary resistance and support to the strakes 5 from the different thrusts to which they are subjected, lugs 7 are formed integrally with the webs 2 and these lugs 7 serve to resist stresses imposed on the strakes only in the operative position of the strakes as shown.

Each lug 7 comprises a recess 8 at its inner end and a toe portion 9 at its outer end which respectively contact with one corner at the inner end of one strake and one side of the adjacent strake.

In this way the strakes are positively positioned and supported and the studs 3 and 4 are relieved of shear stresses when the strakes are rotated with the wheel in the direction shown by the arrow.

The strakes are individually detachable from their operative position and are reversible to an inoperative position in which the ground contacting end of each strake is turned inward in diametrically opposite direction to that shown. The strakes in the inoperative position though still in the same alignment as when in the operative position do not project beyond the tread of the tire and the same holes in the webs and strakes are used to secure the strakes to the webs in their inoperative position.

Each strake 5 is apertured at 10 between the holes for the studs 3 and 4 but nearer to the stud hole 4 than to the stud hole 3, and the aperture 10 when the strakes are in the operative position register with and encircle the rounded projections 11 formed in the ends portions 2 of the ring 1.

On lifting off the strakes to the inoperative position after detaching the studs 3 and 4 the apertures 10 in the strakes do not register with the projections 11 which are the same height as the maximum height of the lugs 7 and their recessed portions 8.

In consequence the strakes may be re-attached in an indrawn position in respect to the ring 1 and on a level base provided by the recessed portions 8 of the lugs 7 and projections 11 which no longer register with the apertures 10 but contact the surfaces of the strakes.

As will be seen from Fig. 2 the apertures for the studs 3 and 4 in the strakes are slightly greater in diameter than the stems of the studs to relieve the latter of shear stress.

Having now described our invention what we claim is:

1. A tractor attachment for vehicle wheels comprising a supporting ring, a plurality of strakes detachably mounted on said ring with one side tangent to a circle within and concentric with said ring and with ends operatively projecting beyond the periphery of said ring, and load sustaining lugs on the ring, each lug fitting against the inner end and outer side of one strake and abutting the inner side of the next adjacent strake.

2. A tractor attachment for vehicle wheels comprising a supporting ring, a plurality of strakes detachably mounted on said ring with one side tangent to a circle within and concentric with said ring and having ends operatively projecting beyond the periphery of said ring, said strakes having apertures, load sustaining lugs on the ring, each lug fitting against the inner end and outer side of one strake and abutting the inner side of the next adjacent strake, and lugs on said ring projecting into the openings in said strakes.

3. A tractor attachment for vehicle wheels comprising a supporting ring, a plurality of strakes detachably mounted on said ring with a longer side tangent to a circle within and concentric with said ring, load sustaining lugs on said ring, each lug fitting against the inner end and outer side of one strake and abutting the inner edge of the next adjacent strake, said strakes having apertures which register with said projections when said strakes are mounted on said ring and with their ends operatively projecting beyond the periphery of said ring, said strakes being mountable in inoperative position entirely within said periphery with said apertures out of register with said projections.

4. A tractor attachment for vehicle wheels comprising a supporting ring, a plurality of strakes detachably mounted on said ring with one side tangent to a circle within and concentric with said ring, load sustaining lugs on the ring, each lug fitting against the inner end and outer side of one strake and abutting the inner edge of the next adjacent strake, said strakes having apertures, and said ring having projections which register with said apertures in the operative positions of the strakes with the ends of the strakes projecting beyond the periphery of said ring, the projections between said lugs being of the same heighth as the lugs to provide surfaces to which the strakes may be secured in their inoperative positions within the periphery of said ring.

5. A tractor attachment for vehicle wheels comprising a supporting ring, a plurality of strakes detachably mounted on said ring with one side tangent to a circle within and concentric with said ring and with ends operatively projecting beyond the periphery of said ring, load sustaining lugs on the ring, each lug fitting against the inner end and outer side of one strake and abutting the inner side of the next adjacent strake, and screws to hold said strakes in position on said supporting ring.

WILLIAM EDWARD HARDEMAN.
REGINALD FRANK DAW.